UNITED STATES PATENT OFFICE.

EDWARD C. KLINE, OF STREATOR, ILLINOIS.

METHOD OF TREATING ASPARAGUS AND KINDRED PLANTS.

958,932. Specification of Letters Patent. Patented May 24, 1910.

No Drawing. Application filed June 21, 1909. Serial No. 503,487.

*To all whom it may concern:*

Be it known that I, EDWARD C. KLINE, a citizen of the United States, residing at Streator, in the county of La Salle and State of Illinois, have discovered a new and useful Method for Treating Asparagus and Kindred Plants in the Bed, of which the following is a description.

The usual method of raising asparagus for the market is to set the plants in a bed of suitably prepared soil and by careful cultivation force the growth of the plants to produce a crop of succulent and tender sprouts that are cut at suitable periods and promptly marketed. The great aim is to secure a tender sprout of uniform size, form and character at each cutting. Asparagus containing a large percentage of water requires careful handling and prompt marketing or it will rapidly deteriorate in quality. The soil also must be carefully prepared and fertilized and suitably watered to produce the rapid growth necessary to secure a superior quality of asparagus. By reason of the peculiar conditions the crop in a given district comes into the market at substantially the same period and the market is thus liable to be overstocked resulting in correspondingly low prices.

The object of my improved method is to improve the quality of the asparagus, increase the yield and at the same time retard or delay the growth of the plants to bring the crop into the market at a time when the demand is somewhat greater and the prices correspondingly higher.

To this end my method consists substantially of the following steps, I set the plants in a suitably prepared bed in the usual manner and preferably when the plants are three or four years old and just prior to or about the time the stalks appear through the earth, I flood the bed with a layer or sheet of water of sufficient depth to check the growth of the plants, maintaining the same for a period depending upon the conditions and circumstances in each case. In the latitude of my home, the plants begin their rapid growth about the 15th of April to about the 10th of May, each year, and are cut from time to time thereafter until the entire crop is harvested.

I have secured satisfactory results by flooding the bed with a sheet of water substantially six inches deep and maintaining the same for about four to seven weeks, then drawing off the water and thereafter proceeding in the harvesting and marketing of the crop in the usual manner. In practice, however, when it is practicable I prefer to erect a suitable dike about the bed and draw the water either by gravity or by a pump from a stream carrying silt and soil from the spring freshets, upon the bed a depth of from two to four feet or even greater depth, and maintain the same for the desired time, which in most cases would probably be three or four weeks. By this method the water keeps cold effectively preventing the growth of the plants, while the contained silt and soil are evenly deposited over the bed in a thin layer by sedimentation serving to restore, fertilize and enrich the bed. Upon draining or pumping out of the water the bed is abundantly supplied with the necessary water contained therein, and the sunshine and higher temperature insured by the delay rapidly bring the plants to perfection for the cutting and marketing. In this practice I have secured good results by flooding the bed the latter part of March and maintaining the water thereon for approximately two months but the time might be varied to considerable extent depending upon the particular conditions at the time and the location of the bed.

I find in practice that by my improved method I secure a markedly increased yield and at the same time the sprouts are larger and more perfect in every way. This more perfect stock coming into the market at the time when it is not glutted readily commands a higher price and an increased profit. It might be also noted that where there is a shortage of labor due to the crops in a particular locality arriving at a harvesting condition or for any other reason labor cannot be procured, the time of harvesting the crop may be delayed considerable time until the labor can be obtained. On the other hand if help could not be procured immediately the crop might be partially or entirely lost.

Having thus described my improved method it is obvious that the same may be varied to a more or less extent without departing from the spirit of my invention.

What I claim as new and desire to secure by Letters Patent is:

The method of treating asparagus and kindred annual plants in the bed, consisting in cultivating the same in the usual manner until the plants begin to sprout, flooding the bed with water to a substantial depth, maintaining the water on the bed for a limited period, and finally drawing off the water from the bed.

In testimony whereof, I have hereunto signed my name in the presence of two subscribing witnesses.

EDWARD C. KLINE.

Witnesses:
ELLEN C. HANSEN,
LLOYD TREMPER.